July 24, 1928.

J. A. CONNELLY 1,677,884

JOINT PACKING

Filed May 4, 1925

James A. Connelly.
INVENTOR

BY
Walter W Burns
ATTORNEY

Patented July 24, 1928.

1,677,884

UNITED STATES PATENT OFFICE

JAMES A. CONNELLY, OF HAMILTON, OHIO.

JOINT PACKING.

Application filed May 4, 1925. Serial No. 27,778.

This invention relates to packing boxes for connecting a hollow rotating part with a non-rotating part and passing, without leakage a fluid such as steam, therebetween as is necessary, for example, in the heating of the interior of rollers such as are used in paper mills and laundries.

The primary object of my invention is the provision of an improved packing box which will effectually retain the fluid under pressure while still permitting one of the parts to rotate.

Another object of my invention is the provision of a packing having a plurality of pairs of contacting surfaces and which permits of a higher velocity of the rotating part without increasing the lineal velocity on the packing contacting surfaces.

Another object of my invention is the provision of a packing having a construction which gives a varying irregular contact, to the packing surfaces, which causes them to be kept worn into perfect contact with each other.

Another and still further object of my invention is the provision of a packing having an improved lubricating means for such a packing.

Other and further objects of my invention will be apparent from a reading of the complete specification.

Referring to the drawing wherein I have illustrated an embodiment of my invention.

Figure 1:
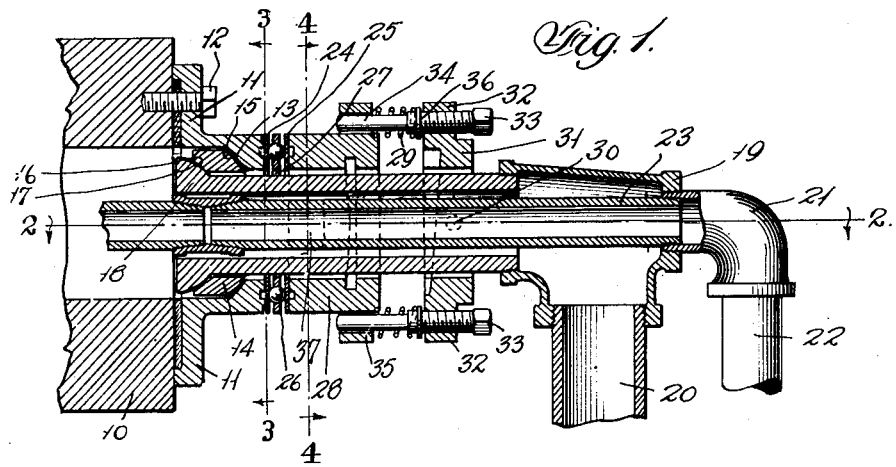
Fig. 1 is a vertical section of my improved packing.
Figure 2:
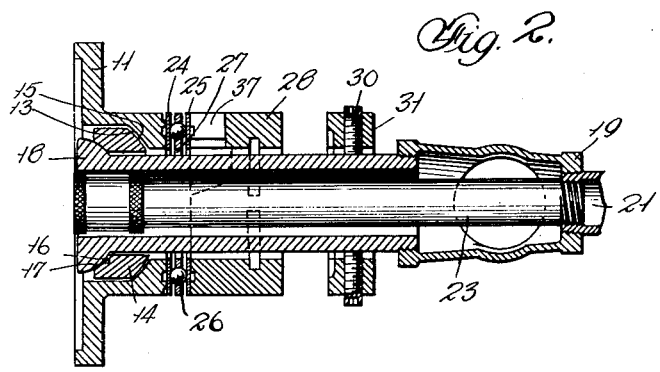
Fig. 2 is a section on the line 2—2 of Fig. 1.
Figure 3:
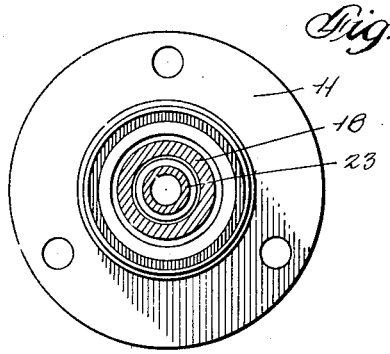
Fig. 3 is a sectional view on the line 3—3 of Fig. 1.
Figure 4:
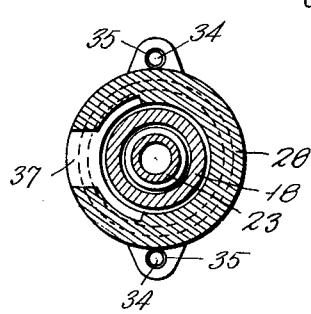
Fig. 4 is a sectional view on the line 4—4 of Fig. 1.

Like reference characters refer to similar parts throughout the drawing. The numeral 10 refers to a revolving portion of a roller such as a calendering-roll of a paper mill. At the end of this roller, is connected the flange 11 of my invention. This flange is held in place by suitable stud bolts 12 which pass through holes of the flange, into the end of the roll 10.

Within this flange member is located the operating portion of the packing box proper.

It will be observed that adjacent the inner opening of the flange is a concave surface 13. This surface 13 is substantially spherical. Within the flange member 11 and adjacent the spherical concave surface 13 is a metallic packing member 14. This packing member 14 is provided with a convex surface 15 which is similar in shape to the surface 13 and is cooperatively in contact therewith. It is also provided with an inner concave surface 16 which is in cooperative contact with a convex surface 17 of a tubular member 18. The curves of these convex and concave surfaces are, preferably, portions of surfaces of spheres having the same center. The purpose of this construction will be later described. This tubular member 18 extends outwardly and is connected at its outer end by a threaded connection to a T-connection member 19. This T member 19 is connected to a pipe 20 which in the embodiment shown is to provide a steam inlet supply. At the outer end of the T member 19 is connected an elbow 21 to which is connected, in the embodiment herein illustrated and described, an outlet pipe 22 for the condensed steam. A pipe 23 is threadedly connected to the inside of the elbow 21 and extends into the roll 10 through the tubular member 18.

As already described, one side of the flange 11 is connected to the roll 10. The opposite side of the member 11 lies against a bearing member 24. Between this bearing member 24 and a similar bearing member 25 is a set of balls 26 which are held in a suitable retainer 27. Thrusting against the bearing member 25 and holding the latter against the balls 26 is a follower 28. This follower 28 is free to move on the tubular member 18 and is held against the bearing member 25 by means of the springs 29. Adjustable along the tubular member 18 and secured thereto by means of the set screws 30, is a collar member 31. This collar member 31 is provided with lugs 32 in which are threaded stud screws 33. These stud screws are provided with extensions 34 which extend through the spring 29 and into the opening in the follower 28. These openings I have designated with the numeral 35 as plainly shown in Fig. 1. The threaded portions of the studs 33 are slightly greater in diameter than the extension 34. The shoulder between the threaded portion and the extension engages a washer 36 which engages the spring 29. When the stud screws 33 are screwed inwardly or to the left as shown in Fig. 1, the spring 29 is compressed and the follower is forced against the bearing 25. By regulating the tension of the spring 29 at opposite sides of the follower 28, the proper amount of pressure against the balls 26 can be obtained.

By loosening the set screws 30 and adjusting the collar 31 along the tubular member 18 it is possible to vary the amount of possible tension in the spring 29.

In the side of the follower 28, adjacent the bearing 25, is arranged a lubricating chamber 37. This chamber has an opening at the top through which a lubricant is permitted to enter into the chamber 37. In this chamber 37 may be placed any suitable lubricant as a medium hard grease or wicking may be placed in the chamber and the wicking permitted to absorb a light oil. In either case, the lubricant will work down and underneath the bearing 25 and will lubricate not only the ball bearing 26, but will also lubricate the packing box composed of the inner portion of the flange member 11, the packing 14 and the convex surface 17 of the tubular member 18.

It will be observed that there is a certain amount of clearance between the inner circumference of the packing member 14 and the outer circumference of the tubular member 18. By means of this clearance the packing member 14 is permitted to have a more or less floating action as it revolves relative to the stationary tubular member 18. The flange member 11 as it revolves, carries the packing member 14 with it, the latter, theoretically, going at half the speed of revolution at which the flange member 11 travels. Due to the clearance between the packing member 14 and the flange member 11, there is an action obtained between the pairs of the adjacent cooperating surfaces which permit of a new surface constantly coming in contact with a new surface, or new portion of the surface, of the cooperating member. This slight movement of the packing member 14 causes a constant seating action between each surface of each pair and its cooperating surface. Due to the fact that the flange member 11 travels at twice the speed of the packing member 14, it is perfectly clear that the combined speed of the surface 16 on the surface 17 and the surface 13 on the surface 15 will be equal to the speed of surface 13 relative to the surface 17. In this way the relative speed between any two surfaces is exactly one half what it would be were it not for the additional metallic packing member 14.

It is to be observed from the drawing that the bearing members 24 and 25 are here illustrated as being flat. This structure is particularly advantageous in making the whole device flexible.

The operation of the device is as follows:—The roll 10 is turned rapidly, the inlet pipe 20 being connected to a source of steam pressure. As the roll turns, it carries with it the flange member 11, the same turns on the packing member 14, which in turn rotates on the surface 17 of the tubular member 18. The tubular member 18 being connected to the T member 19 and the member 20, does not revolve. Since the collar 31 is secured by set screws 30 to the tubular member 18 and the collar member 31 is connected through the extension 34 of the studs 33 to the follower 28, it will be clear that all of these parts hold their position relative to the tubular member 18. The follower 28 is provided with clearance between its inner circumference and the tubular member 18 and is thus permitted to take the changes in position brought about by the pressure of the flange member 11 thereon through the bearing members 24 and 25 and the ball bearing 26.

As the steam condenses, it is drawn off through the pipe 23, the elbow 21 and the pipe 22 in a well known manner.

The action of the packing member 14 which in a way floats between the two surfaces 17 and 13, brings about that ideal condition which is always sought in grinding valves—that an irregular movement shall be produced to bring different particles into contact with each other during each revolution.

It is, of course, obvious that if desirable so to reduce expense in slow speed installations, the bearings 24, 25 and the cooperating balls 26 may be omitted, the adjacent surfaces of the follower 28 and the flange member 11, then coming in contact with each other.

While I have shown and described an embodiment of my invention, I desire to have it understood that I do not limit myself to the exact showing and that modifications and changes may be made without departing from the spirit of my invention and within the scope of the appended claims.

Having described my invention, what I claim is:—

1. A packing box for a pressure chamber comprising a rotating member, and a stationary member, a metallic packing between and having curved surfaces cooperating with corresponding shaped metallic surfaces of the rotating and stationary members, the metallic packing having an opening, one of the members having an enlarged portion greater in size than the coacting opening in the packing, the packing having a portion greater in size than a coacting opening in the other member, so that the pressure within the pressure chamber will tend to force the coacting surfaces together to form a tight joint.

2. A packing box for a pressure chamber comprising a rotating metallic member and a stationary metallic member, one of the two members having a convex face and the other having a concave face, a metallic packing between the two members and having surfaces on opposite sides for coacting with the concave and convex surfaces of the two members, the metallic packing having an opening surrounding a portion of one of the members and having a space between the periphery of the opening and the member surrounded by the packing, one of the members having an enlarged portion greater in size than the coacting opening in the packing, the packing having a portion greater in size than a coacting opening in the other member, so that the pressure within the pressure chamber will tend to force the coacting surfaces together to form a tight joint.

3. A packing box for a pressure chamber comprising a rotating metallic member, and a stationary metallic member, one of the two members having a convex face and the other having a concave face, a metallic packing between the two members and having surfaces on opposite sides for coacting with the concave and convex surfaces of the two members, one of the members having an enlarged portion greater in size than the coacting opening in the packing, the packing having a portion greater in size than a coacting opening in the other member, so that the pressure within the pressure chamber will tend to force the coacting surfaces together to form a tight joint.

4. A packing box for a pressure chamber comprising a rotating metallic member and a stationary metallic member, a metallic packing between the two members and having surfaces coacting with surfaces on the members, the packing surrounding a portion of one of the members with a space therebetween to permit free bodily movement of the packing, a follower surrounding and spaced from the stationary member and mounted for yielding lateral non-rotative movement relative to the stationary member, flat bearings on the rotative member, flat bearings on the rotative member and follower and round bearings therebetween.

5. A packing box comprising a rotating member having an end face, a stationary member, means for closing the joint therebetween, a collar adjustable along the stationary member and means for holding the collar in adjusted position, means connected to the collar for exerting more pressure against one portion of the face of the rotating member than another.

6. A packing box comprising a rotating member, a stationary member, a metallic packing having two curved surfaces one of which coacts with the stationary member and the other of which coacts with the rotating member, a follower mounted on the stationary member and having a lubricant chamber therein, a bearing between the rotating member and the follower, means for forcing the follower toward the rotating member and an opening from the chamber to the bearing.

In testimony whereof I hereunto affix my signature.

JAMES A. CONNELLY.